(12) United States Patent
Lee et al.

(10) Patent No.: US 12,359,006 B2
(45) Date of Patent: Jul. 15, 2025

(54) COMPOSITION FOR POLYMERIZING VINYL CHLORIDE-BASED POLYMER AND METHOD FOR PREPARING VINYL CHLORIDE-BASED POLYMER USING SAME

(71) Applicant: LG CHEM, LTD., Seoul (KR)

(72) Inventors: Se Woong Lee, Daejeon (KR); Heung Kwon Bae, Daejeon (KR); Hyun Min Lee, Daejeon (KR); Kyung Seog Youk, Daejeon (KR); Joong Chul Lim, Daejeon (KR); Jung Rae Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 821 days.

(21) Appl. No.: 17/607,306

(22) PCT Filed: Sep. 25, 2020

(86) PCT No.: PCT/KR2020/013063
§ 371 (c)(1),
(2) Date: Oct. 28, 2021

(87) PCT Pub. No.: WO2021/060909
PCT Pub. Date: Apr. 1, 2021

(65) Prior Publication Data
US 2022/0220232 A1  Jul. 14, 2022

(30) Foreign Application Priority Data
Sep. 27, 2019 (KR) .................... 10-2019-0120119

(51) Int. Cl.
*C08F 6/16* (2006.01)
*C08F 2/30* (2006.01)

(52) U.S. Cl.
CPC . *C08F 6/16* (2013.01); *C08F 2/30* (2013.01)

(58) Field of Classification Search
CPC ...... C08F 2/24; C08F 6/16; C08F 2/30; C08F 259/04
(Continued)

(56) References Cited

U.S. PATENT DOCUMENTS 5,554,707 A   9/1996  Niikuni et al.
6,245,848 B1 * 6/2001  Espiard ................ C08F 259/04
                                                       524/419
(Continued)

FOREIGN PATENT DOCUMENTS

CN   108055849 A   5/2018
EP   0553653       8/1993
(Continued)

OTHER PUBLICATIONS

English machine translation of Detailed Description of KR-2008-0049974A, 5 pages, retrieved from Espacenet on Aug. 22, 2024. (Year: 2008).*

(Continued)

*Primary Examiner* — Fred M Teskin
(74) *Attorney, Agent, or Firm* — BRYAN CAVE LEIGHTON PAISNER LLP

(57) ABSTRACT

The present invention provides a method for preparing a vinyl chloride-based polymer, the method including (1) polymerizing a vinyl chloride-based monomer in the presence of a vinyl chloride-based first seed particle, a vinyl chloride-based second seed particle, and an emulsifier and (2) separating, after the polymerizing, a first vinyl chloride-based polymer and a second vinyl chloride-based polymer which are in a particulate form, wherein the separated first vinyl chloride-based polymer is dried using a fluid bed dryer (FBD), and the first vinyl chloride-based polymer has a smaller average particle diameter ($D_{50}$) than the second vinyl chloride-based polymer, and two kinds of polymers (Continued)

having different physical properties may be prepared through a single manufacturing process.

13 Claims, 1 Drawing Sheet

(58) Field of Classification Search
USPC .................................. 524/834; 528/502 E
See application file for complete search history.

(56) References Cited

U.S. PATENT DOCUMENTS

| 10,017,594 B2 | 7/2018 | Ju et al. |
| 2010/0190946 A1 | 7/2010 | Ahn et al. |
| 2014/0316095 A1* | 10/2014 | Lee ................ C08F 114/06 526/344.2 |
| 2017/0121438 A1 | 5/2017 | Ju et al. |
| 2018/0134822 A1 | 5/2018 | Youk et al. |

FOREIGN PATENT DOCUMENTS

| JP | 2004-224838 A | 8/2004 |
| JP | 2006-306963 A | 11/2006 |
| JP | 3964190 B2 | 8/2007 |
| KR | 10-2008-0049974 A | 6/2008 |
| KR | 10-2017-0047054 A | 5/2017 |
| KR | 10-2019-0046325 A | 5/2019 |
| KR | 10-2019-0075346 A | 7/2019 |
| RU | 2404999 | 11/2010 |

OTHER PUBLICATIONS

English machine translation of Detailed Description of JP 2004-224838A, 10 pages, retrieved from Espacenet on Aug. 22, 2024. (Year: 2004).*

Moskvichev Yu.A. et al., Theoretical Foundations of Chemical Technology: Textbook, 2nd edition, rev., St.-Petersburg, Lan Publishing House, 2016, Extract p. 6, paragraph 3-4.

H. Bouaffar et al., "Besorption of Residual Monomer From PVC Resins In A Fluidized Bed Driver", Journal of Applied Polymer Science, John Wiley & Sons, Inc., vol. 51, No. 6, Feb. 7, 1994, pp. 1119-1127, XP000465165, ISSN: 0021-8995, doi: 10.1002/app.1994.070510618.

* cited by examiner

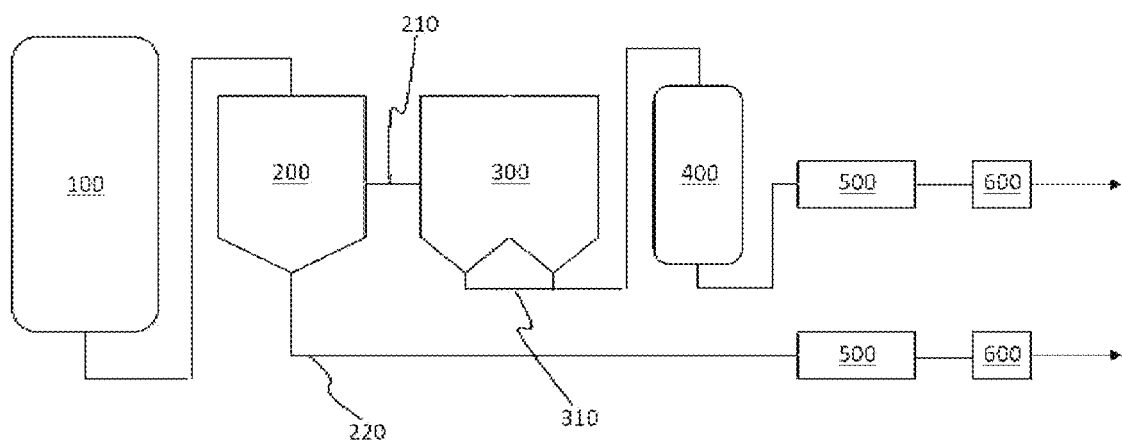

COMPOSITION FOR POLYMERIZING VINYL CHLORIDE-BASED POLYMER AND METHOD FOR PREPARING VINYL CHLORIDE-BASED POLYMER USING SAME

CROSS-REFERENCE TO RELATED APPLICATIONS

The present application is a National Phase entry pursuant to 35 U.S.C. § 371 of International Application No. PCT/KR2020/013063 filed on Sep. 25, 2020, and claims priority to and the benefit of Korean Patent Application No. 10-2019-0120119, filed on Sep. 27, 2019, in the Korean Intellectual Property Office, the disclosures of which are incorporated herein in their entirety by reference.

FIELD

The present invention relates to a method for producing a vinyl chloride-based polymer, and particularly, to a method for producing a vinyl chloride-based polymer by which both a general-purpose vinyl chloride-based polymer and a high-tensile paste vinyl chloride-based polymer may be produced through a single batch process.

BACKGROUND

A vinyl chloride-based polymer, which is a polymer containing at least 50% by weight of a repeating unit derived from a vinyl chloride monomer (VCM), is inexpensive, easy to control a hardness, and applicable to most processing equipment, so that the vinyl chloride-based polymer is used in various application fields. In addition, the vinyl chloride-based polymer may provide a molded article having excellent physical and chemical properties, such as mechanical strength, weather resistance, and chemical resistance, and therefore is widely used in various fields.

A general-purpose vinyl chloride-based polymer for wallpaper paste processing, and a high-tensile vinyl chloride-based polymer paste have different required physical properties, and are thus also different in their polymerization temperature and the manufacturing conditions.

When both a general-purpose grade vinyl chloride-based polymer and a special grade vinyl chloride-based polymer are produced and supplied to the market, a grade change is required at regular intervals, resulting in production loss, cleaning costs, and a mixing problem.

In addition, in the case of a special grade vinyl chloride-based polymer requiring good mechanical properties, a method of increasing the degree of polymerization by lowering the polymerization temperature is usually adopted. However, in this case, productivity per batch may decrease due to a long reaction time.

Therefore, it is necessary to develop a new vinyl chloride-based polymer production method that can solve the problem caused by grade change and does not cause a production loss problem.

SUMMARY

An objective to be achieved by the present invention is to provide a vinyl chloride-based polymer production method that can solve production loss and other problems caused by exchange between a process for a general-purpose paste vinyl chloride-based polymer and a process for a high-tensile paste vinyl chloride-based polymer.

In order to achieve the above objective, an embodiment of the present invention provides a method for producing a vinyl chloride-based polymer, the method including: (1) a step of polymerizing a vinyl chloride-based monomer in the presence of a vinyl chloride-based first seed particle, a vinyl chloride-based second seed particle, and an emulsifier; and (2) a step of separating, after the polymerizing step, a first vinyl chloride-based polymer and a second vinyl chloride-based polymer which are in a particulate form, wherein the separated first vinyl chloride-based polymer is dried using a fluid bed dryer (FBD), and the first vinyl chloride-based polymer has a smaller average particle diameter ($D_{50}$) than the second vinyl chloride-based polymer.

A method for producing a vinyl chloride-based polymer according to the present invention is capable of producing both a general-purpose vinyl chloride-based polymer and a high-tensile paste vinyl chloride-based polymer through a single batch process, so that it is possible to eliminate the necessity of cleaning and a mixing problem that occur during switching between processes for these polymers, and also possible to suppress production loss.

BRIEF DESCRIPTION OF THE DRAWING

The following drawing attached to the specification illustrate preferred examples of the present invention by example, and serve to enable technical concepts of the present invention to be further understood together with detailed description of the invention given below, and therefore the present invention should not be interpreted only with matters in such drawings.

The figure schematically shows the entire process of a method for producing a vinyl chloride-based polymer according to an example of the present invention.

DETAILED DESCRIPTION

Hereinafter, the present invention will be described in more detail to aid understanding of the present invention.

The terms or words used in the present specification and claims should not be interpreted as being limited to ordinary or lexical meanings, and the inventor can appropriately define the concept of terms in order to best describe his or her invention. Based on the principle that it should be interpreted as meanings and concepts consistent with a technical spirit of the present invention.

The term "composition" as used herein includes not only a reaction product and a decomposition product formed from a material of the composition but also a mixture of materials including the composition.

The term "composition for polymerizing vinyl chloride-based polymer" as used herein may indicate a mixture of reactants that are introduced into the reactor up to the point in time, immediately before the polymerization reaction begins, that is, the point in time before a polymerization conversion rate is 0%.

The term "vinyl chloride-based polymer" as used herein may indicate a compound produced by polymerizing a vinyl chloride-based monomer, and may mean a polymer chain derived from a vinyl chloride-based monomer.

The term "plastisol" as used herein may refer to a mixture in which a resin and a plasticizer are mixed so as to be able to be formed, molded or processed into a continuous film by heating, and may refer to, for example, a paste form in which a vinyl chloride-based polymer and a plasticizer are mixed.

The term "plasticizer" as used herein may refer to an organic additive material that functions to improve molding processability of the resin at high temperatures by being added to the thermoplastic resin to increase thermoplasticity.

In the present specification, an average particle diameter ($D_{50}$) in the particle size distribution curve of particles may be defined as a particle diameter corresponding to 50% of the cumulative number of particles. The average particle diameter ($D_{50}$) may be measured, for example, using a laser diffraction method. The laser diffraction method may generally measure a particle diameter from a submicron range to several millimeters, and may obtain results of high reproducibility and high resolution.

A method for producing a vinyl chloride-based polymer, the method including: (1) a step of polymerizing a vinyl chloride-based monomer in the presence of a vinyl chloride-based first seed particle, a vinyl chloride-based second seed particle, and an emulsifier; and (2) a step of separating, after the polymerizing step, a first vinyl chloride-based polymer and a second vinyl chloride-based polymer which are in a particulate form, wherein the separated first vinyl chloride-based polymer is characterized by drying using a fluid bed dryer (FBD), and the first vinyl chloride-based polymer is characterized by having a smaller average particle diameter ($D_{50}$) than the second vinyl chloride-based polymer.

In a method for producing a vinyl chloride-based polymer according to the present invention, two grades of the vinyl chloride-based polymers having different average particle diameters ($D_{50}$) are produced and separated from each other, and are then subjected to separate treatment processes, so that a general-purpose paste vinyl chloride-based polymer and a high-tensile paste vinyl chloride-based polymer, which have different physical properties, may be produced together.

(1) Step of polymerizing vinyl chloride-based monomer in the presence of vinyl chloride-based first seed particle, vinyl chloride-based second seed particle, and emulsifier A method for producing a vinyl chloride-based polymer of the present invention first includes a step of polymerizing a vinyl chloride-based monomer in the presence of a vinyl chloride-based first seed particle, a vinyl chloride-based second seed particle, and an emulsifier, and specifically, the step of polymerizing the vinyl chloride-based monomer may be performed by adding the vinyl chloride-based monomer to a polymerization reactor filled with the vinyl chloride-based first seed particle, the vinyl chloride-based second seed particle, the emulsifier, and an initiator and carrying out a reaction.

In addition, in an example of the present invention, the step of polymerizing the vinyl chloride-based monomer is performed in the presence of a reducing agent and an initiator composition including a water-soluble initiator and an oil-soluble initiator, in addition to the vinyl chloride-based first seed particle, the vinyl chloride-based second seed particle, and the emulsifier. Specifically, the step of polymerizing the vinyl chloride-based monomer may be performed by adding the vinyl chloride-based monomer into the polymerization reactor filled with the vinyl chloride-based first seed particle, the vinyl chloride-based second seed particle, the emulsifier, the initiator composition including the water-soluble initiator and the oil-soluble initiator, and the reducing agent, and performing a reaction.

In the present invention, the first seed particle and the second seed particle may be different materials, and the terms, first and second, may be used to distinguish different seed particles.

Vinyl Chloride-Based First Seed Particle

The vinyl chloride-based first seed particle may have an average particle diameter ($D_{50}$) of 0.1 µm to 0.4 µm, specifically 0.1 µm to 0.3 µm, and more specifically 0.15 µm to 0.25 µm. In addition, with respect to 100 parts by weight of the vinyl chloride-based monomer, the amount of the first seed particle may be 2.5 parts by weight to 10 parts by weight, specifically 3 parts by weight to 8 parts by weight, more specifically 3 parts by weight to 6 parts by weight, and even more specifically 3.5 parts by weight to 5 parts by weight. When the average particle diameter and content of the first seed particle fall out of the above range, it is difficult to obtain the desired amount of the first vinyl chloride-based polymer having the particular form. Therefore, when the particle diameter range and content of the first seed particle satisfy the above range, a high-tensile paste vinyl chloride-based polymer may be properly obtained through a production process.

Vinyl Chloride-Based Second Seed Particle

In addition, the vinyl chloride-based second seed particle may include a particle having a size of 0.1 µm to 1.2 µm, specifically 0.1 µm to 1.0 µm. In this specification, a particle having a size in the above range and included in the second seed particle may indicate that the particle is included in an amount of 51% to 100% by weight with respect to the total amount of the second seed particles. In addition, the vinyl chloride-based second seed particles may have a bimodal particle distribution.

In addition, with respect to 100 parts by weight of the vinyl chloride-based monomer, the amount of the vinyl chloride-based second seed particle may be 2.5 parts by weight to 10 parts by weight, specifically 3 parts by weight to 8 parts by weight, more specifically 3 parts by weight to 6 parts by weight, and even more specifically 3.5 parts by weight to 5 parts by weight. When the average particle diameter and content of the second seed particle fall out of the above range, it is difficult to obtain the desired amount of the produced first vinyl chloride-based polymer having the particular form. Therefore, when the particle diameter range and content of the second seed particle satisfy the above range, a general-purpose paste vinyl chloride-based polymer may be properly obtained through the production process.

Emulsifier

With respect to 100 parts by weight of the vinyl chloride-based monomer, the amount of an emulsifier used may be 0.01 parts by weight to 0.5 parts by weight, specifically 0.02 parts by weight to 0.3 parts by weight, and more specifically 0.05 parts by weight to 0.1 parts by weight. The emulsifier may be at least one selected from the group consisting of sodium lauryl sulfate, lauryl benzene sulfonic acid, alpha-olefin sulfonate, sodium dodecyl benzene sulfonate, sodium lauryl ethoxylated sulfate, sodium octadecyl sulfate, sodium lauryl ether sulfate, and straight chain alkylbenzene sulfonate.

Vinyl Chloride-Based Monomer

A vinyl chloride-based monomer may indicate a vinyl chloride monomer alone, or a mixture of a vinyl chloride monomer and a vinyl-based monomer copolymerizable therewith. In other words, the vinyl chloride-based polymer may be a vinyl chloride homopolymer or a copolymer of a vinyl chloride monomer and a vinyl-based monomer copolymerizable therewith. If the vinyl chloride-based polymer is the copolymer, the vinyl chloride-based polymer may contain at least 50% of vinyl chloride.

The vinyl-based monomer copolymerizable with the vinyl chloride-based monomer may be, although not particularly limited to, for example, olefin compounds such as ethylene, propylene, butene; vinyl esters such as vinyl acetate, vinyl propionate, and vinyl stearate; unsaturated nitriles such as acrylonitrile; vinyl alkyl ethers such as vinyl methyl ether, vinyl ethyl ether, vinyl octyl ether, vinyl lauryl ether; vinylidene halides such as vinylidene chloride; unsaturated fatty acids and anhydrides of these fatty acids such as acrylic acid, methacrylic acid, itaconic acid, maleic acid, fumaric acid, maleic anhydride and itaconic anhydride; unsaturated fatty acid esters such as methyl acrylate, ethyl acrylate, monomethyl maleate, dimethyl maleate, and butyl benzyl maleate esters; and cross linkable monomers such as diallyl phthalate. In addition, the vinyl-based monomer may be used alone or in combination of at least two thereof.

Water-Soluble Initiator

The water-soluble initiator may be at least one selected from the group consisting of potassium persulfate, sodium persulfate, ammonium persulfate and hydrogen peroxide.

With respect to 100 parts by weight of the vinyl chloride-based monomer, the amount of the water-soluble initiator may be 360 ppm or less, 340 ppm or less, or 320 ppm or less, and may be at least 160 ppm, at least 180 ppm, or at least 220 ppm.

Oil-Soluble Initiator

The oil-soluble initiator may be at least one selected from the group consisting of laurylperoxide (LPO), di-2-ethylhexyl peroxycarbonate (OPP), diisopropyl peroxydicarbonate, t-butyl peroxypivalate, t-butyl peroxyneodecanoate, and 2,2-azobisisobutyronitrile.

With respect to the weight of the vinyl chloride-based monomer in the vinyl chloride-based polymer polymerization composition, the amount of the oil-soluble initiator may be 1000 ppm or less, 900 ppm or less, or 850 ppm or less, and may be at least 500 ppm, at least 600 ppm, or at least 700 ppm.

Reducing Agent

In the present invention, the reducing agent may include at least one selected from the group consisting of ascorbic acid, potassium metabisulfite (PMBS), and sodium formaldehyde sulfoxylate (SFS).

With respect to the weight of the vinyl chloride-based monomer in the vinyl chloride-based polymer polymerization composition, the amount of the reducing agent may be 100 ppm or less, 95 ppm or less, or 90 ppm or less, and may be at least 60 ppm, at least 70 ppm, or at least 80 ppm.

Method for Producing Vinyl Chloride-Based First Seed Particle

In an example of the present invention, the vinyl chloride-based first seed particle may be produced by adding a vinyl chloride-based monomer, a first emulsifier, and a polymerization initiator to an aqueous medium, carrying out polymerization, and continuously adding a second emulsifier during the polymerization.

The vinyl chloride-based first seed particle may be produced by a method including steps of: introducing 100 parts by weight of a vinyl chloride-based monomer into a reactor filled with the first emulsifier and initiating polymerization at a temperature of 30° C. to 70° C.; continuously adding the second emulsifier during the polymerization and performing emulsion polymerization for 4 to 10 hours. In the steps above, the reactor filled with the first emulsifier refers to a reactor containing an emulsion including the first emulsifier, and the emulsion may include polymerization water, a polymerization initiator, etc. in addition to the first emulsifier.

A vinyl chloride-based monomer used in the production of the vinyl chloride-based first seed particle may indicate a vinyl chloride monomer alone, or a mixture of a vinyl chloride monomer and a vinyl-based monomer copolymerizable therewith. In other words, the vinyl chloride-based polymer may be a vinyl chloride homopolymer or a copolymer of a vinyl chloride monomer and a vinyl-based monomer copolymerizable therewith. If the vinyl chloride-based polymer is the copolymer, the vinyl chloride-based polymer may contain at least 50% of vinyl chloride.

The vinyl-based monomer copolymerizable with the vinyl chloride-based monomer may be, although not particularly limited to, for example, olefin compounds such as ethylene, propylene, butene; vinyl esters such as vinyl acetate, vinyl propionate, and vinyl stearate; unsaturated nitriles such as acrylonitrile; vinyl alkyl ethers such as vinyl methyl ether, vinyl ethyl ether, vinyl octyl ether, vinyl lauryl ether; vinylidene halides such as vinylidene chloride; unsaturated fatty acids and anhydrides of these fatty acids such as acrylic acid, methacrylic acid, itaconic acid, maleic acid, fumaric acid, maleic anhydride and itaconic anhydride; unsaturated fatty acid esters such as methyl acrylate, ethyl acrylate, monomethyl maleate, dimethyl maleate, and butyl benzyl maleate esters; and cross linkable monomers such as diallyl phthalate. In addition, the vinyl-based monomer may be used alone or in combination of two or more thereof.

The first emulsifier may be at least one selected from the group consisting of sodium lauryl sulfate, lauryl benzene sulfonic acid, alpha-olefin sulfonate, sodium dodecyl benzene sulfonate, sodium lauryl ethoxylated sulfate, sodium octadecyl sulfate, sodium lauryl ether sulfate, and straight chain alkylbenzene sulfonate.

In addition, with respect to 100 parts by weight of the vinyl chloride-based monomer, the amount of the first emulsifier being used may be 0.01 parts by weight to 1 part by weight, or 0.05 parts by weight to 0.5 parts by weight, and the average particle diameter of the finally produced first seed particle may be adjusted according to the amount of the first emulsifier used. For example, as the amount of the first emulsifier increases, the average particle diameter of the finally produced first seed particle may increase.

The polymerization initiator may be a water-soluble initiator, and specifically at least one selected from the group consisting of potassium persulfate, sodium persulfate, ammonium persulfate and hydrogen peroxide.

In addition, the polymerization water may be used in an amount of 70 parts by weight to 130 parts by weight with respect to 100 parts by weight of the vinyl chloride-based monomer, and the polymerization water may be deionized water.

The first emulsifier and the second emulsifier may indicate different types of substance, or indicate only the addition order thereof. Accordingly, the first emulsifier and the second emulsifier may be the same material or different material from each other.

In addition, the second emulsifier may be continuously added in the reactor, with respect to 100 parts by weight of the vinyl chloride-based monomer, the amount of the second emulsifier being used may be 0.01 parts by weight to 9 parts by weight, or 2 parts by weight to 6 parts by weight.

Method for Producing Vinyl Chloride-Based Second Seed Particle

The vinyl chloride-based second seed particle may be produced by adding a vinyl chloride-based monomer, an emulsifier, and a polymerization initiator to an aqueous medium, homogenizing droplets and then performing polymerization.

For example, the vinyl chloride-based second seed particle may be produced by adding 100 parts by weight of the vinyl chloride-based monomer and 0.1 parts by weight to 15 parts by weight or 0.5 parts by weight to 12 parts by weight of a third emulsifier, homogenizing the same, and then performing polymerization at a temperature of 30° C. to 70° C.

The reactor filled with the polymerization initiator may refer to the reactor containing a mixed solution including the polymerization initiator, and the mixed solution may further include polymerized water, a separate emulsifier, a reaction inhibitor and a dispersant, etc., in addition to the polymerization initiator, but not limited thereto.

The vinyl chloride-based monomer used to produce the second seed particle may be the same material as the vinyl chloride-based monomer used to produce the first seed, and may be a vinyl chloride monomer as described above, or a combination of a vinyl chloride monomer and a vinyl monomer copolymerizable therewith. Details are as described above.

With respect to 100 parts by weight of the vinyl chloride-based monomer, the amount of the polymerization initiator used may be 0.01 parts by weight to 2.5 parts by weight, or 0.5 parts by weight to 2 parts by weight, and the average particle diameter of the finally generated second seed particle may be adjusted according to the amount of the polymerization initiator used. For example, as the amount of the polymerization initiator increases, the average particle diameter of the finally produced second seed particle may decrease.

The polymerization initiator may use, although not particularly limited to, at least any one of water-soluble initiators and an oil-soluble initiator, and for example, the polymerization initiator may be at least one selected from the group consisting of peroxy carbonates, peroxy esters, and azo-based compound. Specifically, the polymerization initiator may be at least one selected from the group consisting of laurylperoxide (LPO), di-2-ethylhexyl peroxycarbonate (OPP), diisopropyl peroxydicarbonate, t-butyl peroxypivalate, t-butyl peroxyneodecanoate, and 2,2-azobisisobutyronitrile.

The third emulsifier may be at least one selected from the group consisting of sodium lauryl sulfate, lauryl benzene sulfonic acid, alpha-olefin sulfonate, sodium dodecyl benzene sulfonate, sodium lauryl ethoxylated sulfate, sodium octadecyl sulfate, sodium lauryl ether sulfate, and straight chain alkylbenzene sulfonate, and the separate emulsifier may be the same as the third emulsifier or include the third emulsifier.

In addition, although not particularly limited, the reaction inhibitor may use, for example, paraquinone, hydroquinone, butylated hydroxy toluene, monomethyl ether hydroquinone, 4-t-butyl catechol, diphenyl amine, triisopropanol amine, triethanol amine, etc.

In addition, the dispersant may use, although not particularly limited to, for example, higher alcohols such as lauryl alcohol, myristic alcohol, stearyl alcohol, or higher fatty acids such as lauryl acid, myristic acid, palmitic acid, and stearic acid, etc.

In addition, the polymerization water may be used in an amount of 70 parts by weight to 120 parts by weight with respect to 100 parts by weight of the vinyl chloride-based monomer, and the polymerization water may be deionized water.

Although not particularly limited, the homogenization may be performed for 1 to 3 hours using a homogenizer at a temperature of 20° C. or less, preferably 5° C. to 15° C. In this case, the homogenizer is not particularly limited and may thus use a conventional one known in the art, for example, a rotor-stator type homogenizer, and the total pressure of the homogenizer during the homogenization process may be 1000 psi to 2000 psi. In addition, if necessary, homogenization may be performed by distributing the polymerization mixture to a front stage and a rear stage of the homogenizer.

A polymerization to produce the second seed particle may be performed at a temperature of 30° C. to 70° C. as described above, and specifically, the polymerization may be performed by raising 40° C. to 50° C. from the homogenization temperature to initiate emulsion polymerization and carrying out emulsion polymerization for 5 to 15 hours.

(2) Step of separating, after polymerizing step, first vinyl chloride-based polymer and second vinyl chloride-based polymer which are in particulate form In step (2), separation of a first vinyl chloride-based polymer and a second vinyl chloride-based polymer which are in a particulate form may be performed in a spray dryer.

In the drying process through the spray dryer, the second vinyl chloride-based polymer having a relatively large average particle diameter ($D_{50}$) is separated through a lower portion of the spray dryer, and separation of the first vinyl chloride-based polymer having a relatively small average particle diameter ($D_{50}$) is performed separately.

The second vinyl chloride-based polymer having a relatively large average particle diameter ($D_{50}$) may be obtained and used as a common general-purpose vinyl chloride-based polymer, and the first vinyl chloride-based polymer having a relatively small average particle diameter ($D_{50}$) is obtained after drying through a fluid bed dryer (FBD) and may be used as a high-tensile vinyl chloride-based polymer.

Separation of the first vinyl chloride-based polymer and the second vinyl chloride-based polymer through the spray dryer may be performed by spray drying using the spray dryer, and the spray drying is performed under temperature conditions that an inflow temperature to the spray dryer is 130° C. to 220° C. and an outflow temperature from the spray dryer is 40° C. to 80° C., specifically under temperature conditions that an inflow temperature to the spray dryer is 150° C. to 200° C. and an outflow temperature from the spray dryer is 50° C. to 65° C. When the spray drying is performed in the above temperature range, the drying speed is not too high, so that it is easy to dry without generation of pores on a particle surface. As a result, drying may be performed such that the moisture content in a polymer powder is appropriately low, and separation into the first vinyl chloride-based polymer and the second vinyl chloride-based polymer may be appropriately performed according to the average particle size.

In addition, in an example of the present invention, the spray speed of the spray dryer may be 130 m/s to 180 m/s, specifically 140 m/s to 170 m/s, more specifically 150 m/s to 165 m/s. When the spray speed of the spray dryer satisfies the above range, the first vinyl chloride-based polymer and the second vinyl chloride-based polymer may be separated more appropriately according to the average particle size.

As the outflow temperature increases, the moisture content in the polymer powder decreases, so that the particle size tends to decrease; and as the spray speed increases, the particle size tends to decrease by centrifugal force. When the overall size of the polymer particle becomes too large or too small, it becomes difficult to separate the polymer particle into the first vinyl chloride-based polymer and the second vinyl chloride-based polymer according to the average particle size, so that it is important to control the polymer particle to have an appropriate particle size distribution. Therefore, a method for producing a vinyl chloride-based polymer according to an example of the present invention may include a process of appropriately controlling the outflow temperature of the spray dryer and the spray speed of the spray dryer within the above range, whereby the polymer particle may have an appropriate particle size distribution.

The operating temperature of the fluid bed dryer (FBD) where the first vinyl chloride-based polymer is dried may be 83° C. to 100° C., and specifically 85° C. to 95° C. The operating temperature of the fluid bed dryer (FBD) may be a temperature equal to or higher than the glass transition temperature (Tg) of the first vinyl chloride-based polymer, and when the first vinyl chloride-based polymer is dried in the above range, the surface strength of the first vinyl chloride-based polymer may be increased, and the tensile strength may be increased, so that a high-tensile vinyl chloride-based polymer may be produced. If the operating temperature of the fluid bed dryer (FBD) is lower than the above range, appropriate effects may not be obtained, and if the operating temperature is higher than the above range, the vinyl chloride-based polymer may deteriorate to degrade physical properties thereof.

A drying time using the fluid bed dryer may be performed for 5 to 60 minutes, specifically 10 to 30 minutes. When drying is performed in the above range, the surface strength of the first vinyl chloride-based polymer may be increased, and the tensile strength may be increased, so that a high-tensile vinyl chloride-based polymer may be produced. If the drying time is shorter than the above range, appropriate effects may not be obtained; and if the drying time is longer than the above range, the vinyl chloride-based polymer may deteriorate to degrade physical properties thereof.

A dry using the fluid bed dryer in the present invention, that is, "fluidized bed dry" is a method of fluidizing particles or powder to be dried with hot air and drying while mixing and dispersing the particles or powder, and may indicate a method in which the particles or powder to be dried are supplied over a perforated plate and flow under the perforated plate, and hot air is blown upward from below the perforated plate in in a reverse direction of the flow of the particles or powder to be dried to fluidize and heat the particle or powder to be dried.

The first vinyl chloride-based polymer and the second vinyl chloride-based polymer may be milled to facilitate processing, and therefore the method for producing a vinyl chloride-based polymer according to an example of the present invention may further include a step of milling the first vinyl chloride-based polymer and the second vinyl chloride-based polymer.

The figure schematically illustrates the overall processes of a method for producing a vinyl chloride-based polymer according to an example of the present invention.

Referring to the figure, in a method for producing a vinyl chloride-based polymer according to an example of the present invention, a vinyl chloride-based monomer is polymerized in a reactor 100 in the presence of a vinyl chloride-based first seed particle, a vinyl chloride-based second seed particle, and an emulsifier, then the polymerized product is put into a spray dryer 200 to perform spray drying, and, through spray drying in the spray dryer 200, the first vinyl chloride-based polymer, in particulate form, having a relatively small average particle diameter ($D_{50}$) is discharged to a first discharge line 210 provided on a side surface of the spray dryer 200, and a second vinyl chloride-based polymer, in particulate form, having a relatively large average particle diameter ($D_{50}$) is discharged to a second discharge line 220 provided below the spray dryer 200.

A separated first vinyl chloride-based polymer is filtered through a bag filter 300, transferred to a fluid bed dryer 400 through a lower line 310, and dried through the fluid bed dryer 400. The first vinyl chloride-based polymer and the second vinyl chloride-based polymer are respectively screened 500 and milled 600, as necessary, through which two grades of vinyl chloride-based polymer resins having different physical properties may be obtained.

EXAMPLES

Hereinafter, the present invention will be described in more detail by Examples and Experimental Examples. However, following Examples and Experimental Examples are for illustrative purposes only, and the scope of the present invention is not limited thereto.

Preparation Example 1—Vinyl Chloride-Based First Seed Particle 230 kg of polymerization water, 184 g of sodium lauryl sulfate (SLS) as a first emulsifier, and 110 g of potassium persulfate (KPS) as a water-soluble initiator were added into a 500 L high-pressure reactor, followed by vacuuming the reactor while stirring. After adding 185 kg of a vinyl chloride monomer to the reactor in a vacuum state, the temperature of the reactor was raised to 56° C. to perform polymerization. When the polymerization reaction started, 11.1 kg of sodium lauryl sulfate (SLS) as a second emulsifier was continuously added into the reactor for 5 hours. Then, when the pressure of the reactor reached 4 kg/cm$^2$, the reaction was terminated and an unreacted vinyl chloride monomer was recovered and removed to produce a vinyl chloride-based first seed having an average particle diameter ($D_{50}$) of 0.2 μm.

Preparation Example 2—Vinyl Chloride-Based Second Seed Particle 73 kg of deionized water, 1.21 kg of lauryl peroxide (LPO), and 0.9 g of paraquinone were added to a 200 L high-pressure reactor, and the reactor was vacuumed at −730 mmHg. 66 kg of a vinyl chloride monomer and 7.8 kg of sodium dodecyl benzene sulfonate as an emulsifier were added to the reactor in a vacuum state, followed by stirring for 15 minutes. The internal temperature of the reactor was lowered to 20° C. or less and homogenization was performed for 2 hours using a rotor-stator type homogenizer. When the homogenization was completed, the internal temperature of the reactor was adjusted to 42° C. and polymerization was performed. Resultantly, after 558 minutes, the pressure of the reactor reached 3.5 kg/cm² to terminate the reaction, and the unreacted vinyl chloride monomer was recovered and removed to thereby obtain a bimodal second seed latex having a particle size distribution of 0.1 μm to 1.0 μm.

Example 1

191 kg of polymerization water, 880 g of potassium persulfate (KPS) as a water-soluble initiator (concentration of 4.5%), 125 g of lauryl peroxide (LPO) as an oil-soluble initiator, and 2,000 g of ascorbic acid as a reducing agent (concentration of 0.66%), 17.7 kg (concentration of 39%) of a first seed particle, and 18 kg (concentration of 38%) of a second seed particle were added to a 500 L high pressure reactor, followed by vacuuming the reactor. After adding 153 kg of a vinyl chloride monomer to the reactor in a vacuum state, the temperature of the reactor was raised to 58° C. to perform polymerization. When the polymerization reaction started, sodium lauryl sulfate (SLS) 10.7 kg (28% concentration) as an emulsifier was continuously added to the reactor for 3 hours. Then, after the pressure of the reactor reached 3.5 kg/cm², the reaction was terminated, an unreacted vinyl chloride monomer was recovered, and then a first vinyl chloride-based polymer and a second vinyl chloride-based polymer were obtained through a post process.

The post process was performed using an apparatus as illustrated in the figure, and spray drying was performed for 15 minutes under conditions that an inflow temperature to a spray dryer was 195° C., the outflow temperature from the spray dryer was 60° C., and the spray speed was 157 m/s. Fluidized bed drying was performed on the first vinyl chloride-based polymer having a smaller average particle diameter ($D_{50}$), and the fluidized bed drying was performed at a temperature of 85° C. for 15 minutes.

Screening was performed using a 60-mesh, and milling was performed at 10,000 rpm using ZM 200 from RETSCH.co.

Example 2

A first vinyl chloride-based polymer and a second vinyl chloride-based polymer were respectively obtained in the same manner as in Example 1, except that the fluidized bed drying temperature for obtaining the first vinyl chloride-based polymer was changed to 90° C.

Example 3

A first vinyl chloride-based polymer and a second vinyl chloride-based polymer were respectively obtained in the same manner as in Example 1, except that the fluidized bed drying temperature for obtaining the first vinyl chloride-based polymer was changed to 95° C.

Example 4

A first vinyl chloride-based polymer and a second vinyl chloride-based polymer were respectively obtained in the same manner as in Example 1, except for adding 600 g of potassium persulfate (KPS) as a water-soluble initiator (concentration of 4.5%), 145 g of lauryl peroxide (LPO) as an oil-soluble initiator, 1,800 g of ascorbic acid as a reducing agent (concentration of 0.66%), 19.2 kg of a first seed particle (concentration of 38.5%), and 16.6 kg of a second seed particle (concentration of 38.5%).

Example 5

A first vinyl chloride-based polymer and a second vinyl chloride-based polymer were respectively obtained in the same manner as in Example 4, except that the fluidized bed drying temperature for obtaining the first vinyl chloride-based polymer was changed to 90° C.

Example 6

A first vinyl chloride-based polymer and a second vinyl chloride-based polymer were respectively obtained in the same manner as in Example 4, except that the fluidized bed drying temperature for obtaining the first vinyl chloride-based polymer was changed to 95° C.

Example 7

A first vinyl chloride-based polymer and a second vinyl chloride-based polymer were respectively obtained in the same manner as in Example 1, except for using an outflow temperature from a spray dryer of 65° C. and the spray speed of 136 m/s during spray drying.

Example 8

A first vinyl chloride-based polymer and a second vinyl chloride-based polymer were respectively obtained in the same manner as in Example 1, except for using an outflow temperature from a spray dryer of 75° C. and the spray speed of 172 m/s during spray drying.

Example 9

A first vinyl chloride-based polymer and a second vinyl chloride-based polymer were respectively obtained in the same manner as in Example 1, except for using an outflow temperature from a spray dryer of 80° C. and the spray speed of 165 m/s during spray drying.

Comparative Example 1

A vinyl chloride-based polymer was obtained in the same manner as in Example 1, except that after polymerization, separation of particles was not performed in spray drying and separate fluidized bed drying was not performed.

Comparative Example 2

A vinyl chloride-based polymer was obtained in the same manner as in Example 1, except that after polymerization, separation of particles was not performed in spray drying and fluidized bed drying was performed on all particles.

Comparative Example 3

A first vinyl chloride-based polymer and a second vinyl chloride-based polymer were respectively obtained in the same manner as in Example 1, except that particles are separated in spray drying after polymerization, and thereafter fluidized bed drying was performed on the second vinyl chloride-based polymer having a relatively large average particle diameter ($D_{50}$) instead of the first vinyl chloride-based polymer.

Comparative Example 4

A first vinyl chloride-based polymer and a second vinyl chloride-based polymer were respectively obtained in the same manner as in Example 1, except that particles are separated in spray drying after polymerization, and thereafter separate fluidized bed drying was not performed.

Comparative Example 5

A first vinyl chloride-based polymer and a second vinyl chloride-based polymer were respectively obtained in the same manner as in Example 4, except that the fluidized bed drying temperature for obtaining the first vinyl chloride-based polymer was changed to 80° C.

Experimental Example

1) Particle Size Distribution Measurement

Vinyl chloride-based polymers respectively produced in Examples 1 to 9 and Comparative Examples 1 to 5 were diluted to 15% by weight in deionized water, and measured in a wet mode using a particle size analyzer (SYMPATEC HELOS KR).

2) Viscosity Measurement

Plastisols were respectively produced by stirring 100 parts by weight of a vinyl chloride-based polymer respectively produced in Examples 1 to 9 and Comparative Examples 1 to 5 and 60 g of dioctylphthalate (DOP) at 800 rpm for 10 minutes using a Werke mixer (EUROSTAR IKA). The produced plastisols were kept at 25° C. for 1 hour using a thermostat, and then measured under the condition of a No. 4 spindle 12 rpm using a viscometer (AMETEK BROOKFIELD (RV)).

3) Tensile Strength Measurement

Specimens were produced using the plastisols produced in 2), the experiment was conducted according to ASTM D638.

TABLE 1

| | First vinyl chloride-based polymer | | | | | Second vinyl chloride-based polymer | | | |
|---|---|---|---|---|---|---|---|---|---|
| | Particle size (μm) | | | Visc. | Tens. str. | Particle size (μm) | | | Visc. |
| | $D_{10}$ | $D_{50}$ | $D_{90}$ | (CP) | (MPa) | $D_{10}$ | $D_{50}$ | $D_{90}$ | (CP) |
| Example 1 | 4.5 | 32.6 | 96.1 | 10,200 | 5.74 | 48.4 | 98.0 | 171.7 | 15,400 |
| Example 2 | 5.8 | 39.1 | 99.7 | 9,800 | 5.85 | 48.4 | 98.0 | 171.7 | 15,400 |
| Example 3 | 5.1 | 34.5 | 97.2 | 10,300 | 5.69 | 48.4 | 98.0 | 171.7 | 15,400 |
| Example 4 | 3.9 | 35.7 | 100.9 | 9,500 | 5.92 | 55.6 | 105.1 | 186.5 | 14,200 |
| Example 5 | 4.1 | 38.4 | 94.5 | 9,900 | 5.80 | 55.6 | 105.1 | 186.5 | 14,200 |
| Example 6 | 3.8 | 31.8 | 98.8 | 10,800 | 5.69 | 55.6 | 105.1 | 186.5 | 14,200 |
| Example 7 | 5.7 | 38.6 | 100.1 | 9.700 | 5.62 | 50.2 | 100.5 | 176.2 | 14,800 |
| Example 8 | 4.0 | 31.1 | 95.8 | 10,400 | 5.71 | 46.8 | 96.9 | 162.3 | 15,900 |
| Example 9 | 4.3 | 31.4 | 95.2 | 10,400 | 5.76 | 48.0 | 97.1 | 170.4 | 15,800 |
| Comp. Ex. 1 | 11.8 | 69.4 | 164.5 | 14,600 | 4.62 | — | — | — | — |
| Comp. Ex. 2 | 13.5 | 75.2 | 170.6 | 25,900 | 4.96 | — | — | — | — |
| Comp. Ex. 3 | 6.0 | 37.1 | 92.5 | 13,600 | 4.73 | 52.4 | 100.6 | 178.5 | 35,700 |
| Comp. Ex. 4 | 3.9 | 40.5 | 98.5 | 15,900 | 4.68 | 44.5 | 99.1 | 195.5 | 15,300 |
| Comp. Ex. 5 | 5.2 | 34.6 | 95.4 | 15,300 | 4.81 | 41.5 | 94.2 | 187.3 | 14,100 |

In Examples 1 to 9, a first vinyl chloride-based polymer exhibits high-tensile strength due to being subjected to a drying process using a fluid bed dryer. This is because the drying process is performed by a fluid bed dryer at a temperature equal to or higher than the glass transition temperature (Tg) of a vinyl chloride-based polymer, whereby the outer wall of the first vinyl chloride-based polymer is heat-treated, the surface of the particle becomes hard, and the tensile strength increases. Therefore, in Comparative Examples 1 and 4 in which the drying process was not performed by a fluid bed dryer and in Comparative Example 5 in which a process was performed by the fluid bed dryer at a temperature below the glass transition temperature (Tg) of the vinyl chloride-based polymer, an appropriate tensile strength increasing effect was not obtained, thereby exhibiting a relatively low tensile strength. Meanwhile, in Comparative Examples 2 and 3, the drying process was also performed on a vinyl chloride-based polymer having a relatively large average particle diameter by using a fluid bed dryer for, and in this case, it was confirmed that the particle was broken in the milling process after the drying process and the tensile strength increasing effect disappeared. In addition, in Comparative Examples 2 and 3, it was observed that the viscosity in production of plastisol was high. It is believed through analysis that this is because the amount of plasticizer freely located around the particle was reduced due to penetration of the plasticizer into the broken cross section. On the other hand, Examples 1 to 9 exhibit low viscosity because the drying process was performed on the first vinyl chloride-based polymer having a relatively small average particle diameter by using a fluid bed dryer to allow the surface of the particle became hard and maintain the shape of the particle during the milling process, so that the plasticizer did not penetrate into the particle.

Meanwhile, in the present invention, through the comparison between Example 1 and Examples 7 to 9, the effects according to an outflow temperature from the spray dryer and the spray speed can be confirmed. In Example 7, the outflow temperature was slightly higher and the spray speed was lower than those of Example 1, so that the overall particle size in Example 7 was greater than that of Example 1 because the low spray speed has a greater effect. In addition, in Example 8, the outflow temperature was slightly higher and the spray speed was also higher than those of Example 1, so that the overall particle size in Example 8 was smaller compared to Example 1 because of being affected by the high spray speed and the high outflow temperature. Furthermore, in Example 9, the outflow temperature was slightly higher and the spray speed was also slightly higher than those of Example 1, so that the overall particle size in Example 9 was smaller compared to Example 1 because of being affected by the high spray speed and high outflow temperature, but was relatively larger compared to Example 8 because of the lower spray speed. Consequently, it can be confirmed that the particle sizes of the two grades of polymers can be controlled by the outflow temperature and the spray speed.

As described above, according to the production method of the present invention, the first vinyl chloride-based polymer having a relatively small average particle diameter may be obtained as a polymer having high-tensile strength through drying using a fluid bed dryer, and the second vinyl chloride-based polymer having a relatively large average particle diameter may be obtained as a general-purpose polymer, so that two grades of polymers with different physical properties may be produced through a single process.

EXPLANATION OF SYMBOLS

100: a reactor
200: a spray dryer
210: a first discharge line
220: a second discharge line
300: a bag filter
310: a line
400: a fluid bed dryer
500: a screen
600: a mill

The invention claimed is:

1. A method for producing a vinyl chloride-based polymer, the method comprising:
   (1) polymerizing a vinyl chloride-based monomer in the presence of a vinyl chloride-based first seed particle, a vinyl chloride-based second seed particle, and an emulsifier; and
   (2) separating, after the polymerizing, a first vinyl chloride-based polymer and a second vinyl chloride-based polymer which are in a particulate form,
   wherein the separated first vinyl chloride-based polymer is dried using a fluid bed dryer (FBD), and
   the first vinyl chloride-based polymer has a smaller average particle diameter ($D_{50}$) than the second vinyl chloride-based polymer,
   wherein the vinyl chloride-based first seed particle is produced by adding a vinyl chloride-based monomer, a first emulsifier, and a polymerization initiator to an aqueous medium, performing polymerization, and continuously adding a second emulsifier during the polymerization,
   wherein the vinyl chloride-based second seed particle is produced by adding a vinyl chloride-based monomer, an emulsifier, and a polymerization initiator to an aqueous medium, homogenizing droplets and then performing polymerization,
   wherein the fluid bed dryer is operated at a temperature of 83° C. to 100° C.

2. The method for producing a vinyl chloride-based polymer of claim 1, wherein the separation of the particulate first vinyl chloride-based polymer and the second vinyl chloride-based polymer is performed in a spray dryer.

3. The method for producing a vinyl chloride-based polymer of claim 2, wherein spray drying is performed through the spray dryer, and
   the spray drying is performed under temperature conditions of an inflow temperature to the spray dryer is 130° C. to 220° C. and an outflow temperature from the spray dryer is 40° C. to 80° C.

4. The method for producing a vinyl chloride-based polymer of claim 2, wherein a spray speed of the spray dryer is 130 m/s to 180 m/s.

5. The method for producing a vinyl chloride-based polymer of claim 1, wherein the fluid bed dryer is operated at a temperature of 85° C. to 95° C.

6. The method for producing a vinyl chloride-based polymer of claim 1, wherein the step of polymerizing the vinyl chloride-based monomer is performed in the presence of a reducing agent and an initiator composition comprising a water-soluble initiator and an oil-soluble initiator, in addition to the vinyl chloride-based first seed particle, the vinyl chloride-based second seed particle, and the emulsifier.

7. The method for producing a vinyl chloride-based polymer of claim 6, wherein the water-soluble initiator is at least one selected from the group consisting of potassium persulfate, sodium persulfate, ammonium persulfate and hydrogen peroxide.

8. The method for producing a vinyl chloride-based polymer of claim 6, wherein the oil-soluble initiator is at least one selected from the group consisting of laurylperoxide (LPO), di-2-ethylhexyl peroxycarbonate (OPP), diisopropyl peroxydicarbonate, t-butyl peroxypivalate, t-butyl peroxyneodecanoate, and 2,2-azobisisobutyronitrile.

9. The method for producing a vinyl chloride-based polymer of claim 1, wherein the vinyl chloride-based first seed particle has an average particle diameter ($D_{50}$) of 0.1 μm to 0.4 μm.

10. The method for producing a vinyl chloride-based polymer of claim 1, wherein the vinyl chloride-based second seed particle has an average particle diameter ($D_{50}$) of 0.1 μm to 1.0 μm.

11. The method for producing a vinyl chloride-based polymer of claim 1, wherein in the polymerizing, the vinyl chloride-based first seed particle is included in an amount of 5 to 15 parts by weight with respect to 100 parts by weight of the vinyl chloride-based monomer.

12. The method for producing a vinyl chloride-based polymer of claim 1, wherein in the separating, the vinyl chloride-based second seed particle is included in an amount of 5 to 15 parts by weight with respect to 100 parts by weight of the vinyl chloride-based monomer.

13. The method for producing a vinyl chloride-based polymer of claim 6, wherein the reducing agent includes at least one selected from the group consisting of ascorbic acid, potassium metabisulfite (PMBS), and sodium formaldehyde sulfoxylate (SFS).

* * * * *